Patented Nov. 8, 1932

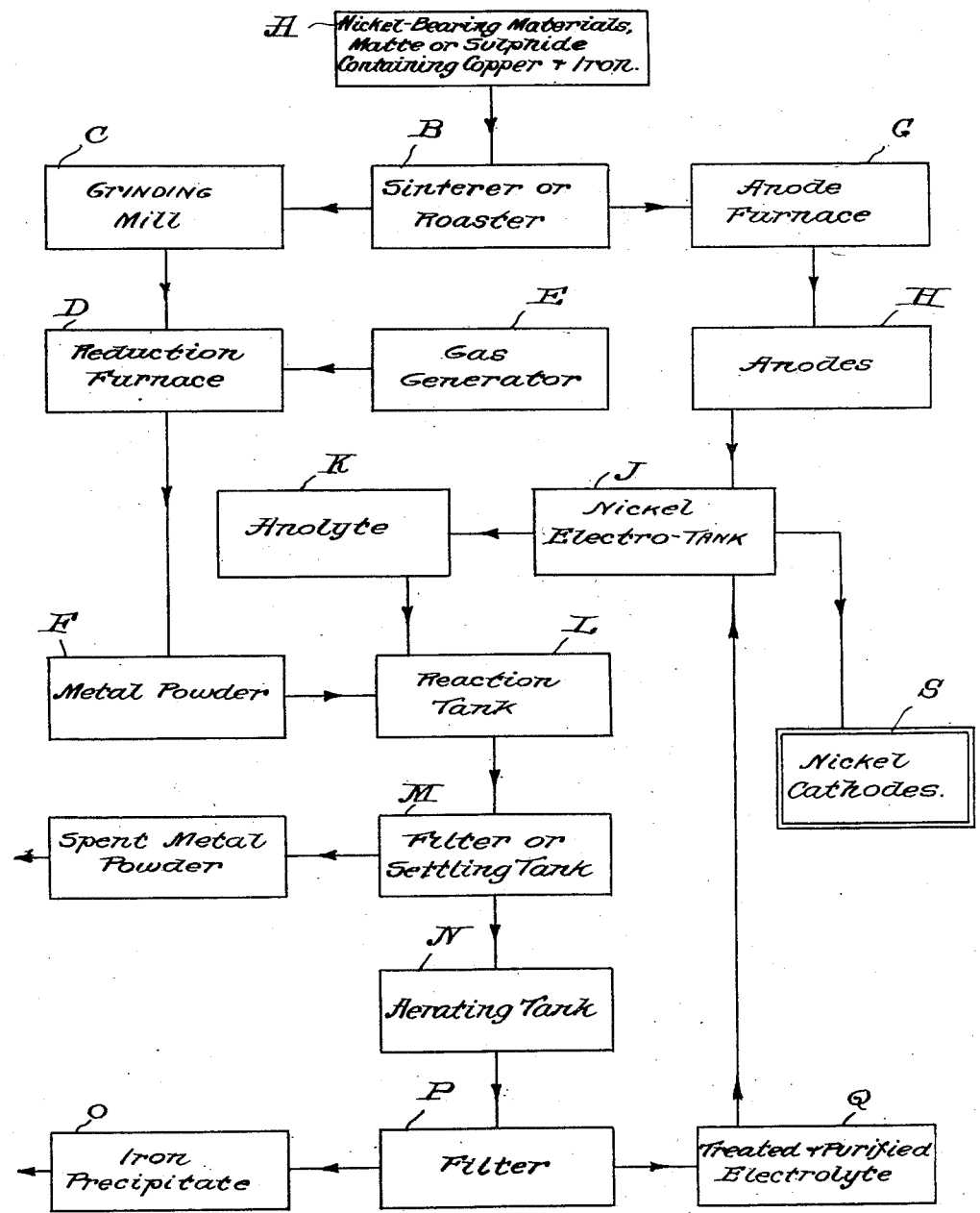

1,887,037

UNITED STATES PATENT OFFICE

ROBERT LEE PEEK, OF TORONTO, ONTARIO, AND CARL ALEXANDER KNITTEL, OF PORT COLBORNE, ONTARIO, CANADA, ASSIGNORS TO THE INTERNATIONAL NICKEL COMPANY, INC., OF NEW YORK, N. Y., A CORPORATION OF DELAWARE

PROCESS OF REFINING NICKEL BEARING MATERIALS

Application filed August 15, 1930. Serial No. 475,446.

The present invention relates to a process of refining nickel-bearing materials and more particularly to a process of producing nickel of high purity from nickel-copper mattes containing iron.

It has been the customary procedure in the production of nickel from mattes containing copper and iron to make as an initial step an approximate separation of copper-containing material from nickel-containing material. The latter material contaminated with various metals including copper and iron was subjected to a series of operations to produce metallic nickel or a nickel salt. One procedure which has been used to a considerable extent involved reducing the nickel-containing material to a metallic anode containing nickel contaminated with copper and iron which was used in an electrolytic process for the production of electrolytic nickel. The solution of electrolyte resulting from the dissolution of the metal constituting the anode contained in addition to nickel such impurities as copper and iron. It was necessary to remove such solution from the electrolytic cell and then treat the thus-removed solution to separate copper and iron therefrom. Usually copper was removed by cementation and iron was removed by treating the solution with a basic reagent such as nickel carbonate, sodium carbonate, calcium hydroxide and the like. The aforesaid procedure had many disadvantages and objections. The more objectionable features were that foreign reagents had to be added to the solution under treatment whereby objectionable compounds accumulated in the solution; that extra and cumbersome equipment had to be used in the said treatment; and that additional operating expense was involved. Many attempts have been made to provide the art with a process which was free from the aforesaid disadvantages and objections and which was acceptable commercially and industrially.

It is an object of the present invention to provide a process which is free from the objectionable features noted hereinabove and which remedies the situation confronting the art.

It is another object of the invention to provide a cyclical process which eliminates the use of extraneous alkaline reagents and additional equipment, which is simple and economical and which can be conducted on an industrial scale in a thoroughly practical manner.

It is a further object of the invention to provide a process of unitary character which is practically self supporting and which involves no cumbersome apparatus for industrial use and in which copper and iron are removed in an effective and efficient manner and which provides a solution containing nickel which has a satisfactory constitution for returning directly to the operation of electrolytic production of nickel without further treatment.

Other objects and advantages of the invention will become apparent from the following description.

The present invention is based upon the discovery that when metallic nickel in a subdivided form as made by low temperature gaseous reduction of nickel oxide is added to the nickel solution contaminated with copper and iron in sufficient quantities it will not only cement out or precipitate the copper but will also reduce the hydrogen ion concentration to such an extent that subsequent aeration of the solution will cause the precipitation of the iron as hydroxide. In this manner a nickel solution can be so purified that it may be returned directly to the electro-tanks for the electrolytic production of nickel.

The simultaneous cementation of copper and reduction of hydrogen ion concentration by treatment of the impure nickel solution with finely divided chemically active nickel such as results from low temperature gaseous reduction of nickel oxide shortens the time and facilitates the purification of the solution and avoids the addition of alkaline compounds which cause the accumulation of undesirable salts in the solution. Substantially the same result may be had by the use of finely divided nickel made by high temperature charcoal-reduced nickel oxide, but such material requires a prolonged time at elevated temperature to accomplish the same end.

It has been found that the aforesaid procedure may be accomplished in the most economical manner by dividing the matte into two parts, a minor part and a major part. The relative amounts in each of these parts depends upon the copper contents of the matte. The minor part should be large enough so that it will contain sufficient nickel after reduction to metallic condition that when added to the contaminated nickel solution, it will not only cause precipitation of the copper contained therein but will also reduce the concentration of the hydrogen ions to such an extent that iron can be precipitated in the form of iron hydroxide upon aeration of the solution. By this procedure a unitary process is provided which is self supporting and which can be carried into practice readily and easily.

For a better understanding of the invention the following description of illustrative examples will be given in conjunction with the accompanying drawing which depicts somewhat diagrammatically a flow sheet of a process involved in carrying the present invention and discovery into practice.

The raw material to be treated may be any appropriate nickel-bearing material contaminated with copper and iron. The more usual nickel-bearing materials are Bessemer mattes resulting from a treatment of nickel-copper sulphide ores or nickel bottoms contaminated with copper and iron which are produced by the well known Orford process. Of course other appropriate nickel-bearing materials which are contaminated with copper and iron can be used just as well as the ones specifically indicated.

When the aforesaid mattes or bottoms are used, they are substantially desulphurized by heating in a pulverized or granulated condition in a current of air. In carrying out this operation any appropriate apparatus may be used, for instance, one of the usual types of calcining furnaces or sintering apparatus, it is preferred however, to use the so-called "Down-draft" sintering apparatus. The sulphur content of the mattes or bottoms is reduced to the lowest amount commercially practicable in a sintering apparatus which is usually about 0.2 to 0.6%.

After the removal of sulphur from the mattes or bottoms, the desulphurized material may be treated for the removal of a major portion of the copper in any suitable manner. For instance, the mattes or bottoms may be ground and then leached with a solvent for copper oxide, such as sulphuric acid. This leaching usually is advisable in the case of Bessemer mattes but is usually unnecessary in the case of nickel bottoms of the Orford process.

After the removal of copper from the nickel-bearing material, the residue therefrom consists primarily of oxides of nickel, oxides of copper and oxides of iron. The residue is divided into two parts, a major part and a minor part. As described hereinabove, the minor part is of such a size that upon reduction, metallic nickel will be present in sufficient amount in the reduced metallic mass so that the latter can be used for treating the contaminated nickel liquor resulting from the electrolytic treatment of the major portion of the aforesaid residue. Thus, for example, if the residue contained 76% of nickel, 2% copper and 0.6% of iron, the residue will be divided so that the minor part constitutes about 3.5% of the residue and the major part constitutes about 96.5% of the residue.

The minor part is ground to a suitable fineness, say about 40 mesh to about 60 mesh. The ground minor part is heated in contact with a reducing gas, such as water gas. The heating of the ground residue in the presence of the reducing gas is carried out at such a low temperature that there is practically no incipient sintering of the metal so produced. This temperature is usually no higher than about 500° C. Generally speaking, the preferred temperature lies in a range of about 300° C. to about 500° C. The lower the temperature, the more suitable is the metallic mass for its subsequent use. After the oxide residue has been reduced in accordance with the aforesaid procedure, the resulting metallic mass is cooled under such conditions that the metal does not reoxidize to any substantial extent. The metallic mass thus produced is in the form of a powder having large and extended surfaces which act very effectively in the subsequent treatment of contaminated nickel solution from the nickel electro-plating tank.

The larger part of the nickel-bearing material is treated in the customary way with coke, coal, charcoal or the like in a furnace for making nickel anodes containing other metals including copper and iron.

The larger part of the nickel anodes are then placed in electrolytic tanks for the electrolytic deposition of nickel. In practice, it is preferred to carry out the electrolytic production of nickel in a cell having a pervious diaphragm which separates the anolyte from the catholyte and through which a flow of electrolyte is maintained from the cathode to the anode. This flow has sufficient velocity to sweep back and exclude from the cathode side of the porous diaphragm the ions resulting from the dissolution of the anode metal. A portion of the anolyte is preferably removed continuously and treated for the removal of copper and iron.

In treating the removed portion of the nickel anolyte which is contaminated with copper and iron, the removed anolyte is first preferably heated and then the metal powder produced from the minor portion of the residue is added thereto. The entire mass is agitated for a sufficient time to cause the cementation of the copper. The spent metallic powder and cemented copper are separated from the anolyte in any suitable way as by filtering or settling.

Sufficient metal powder is added in the cementation operation to reduce the hydrogen ion concentration, of the remote anolyte to such an extent that the pH value is about 5.6 or higher. With this hydrogen ion concentration, it is commercially practicable to precipitate iron as iron hydroxide by passing air through the anolyte. The precipitation of the iron hydroxide sets acid free in the solution and the hydrogen ion concentration therein is restored practically to its normal value, i. e., the pH value is about 4.5 to 5.6. In case the hydrogen ion value is not exactly the desired amount, sulphuric acid may be added to bring the hydrogen ion concentration to its proper value. The precipitated iron hydroxide is removed from the solution so that a clear filtrate is produced. This clear filtrate is a purified nickel electrolyte which can be used as the catholyte in the electro-tanks for the electrolyte production of nickel.

Referring more particularly to the accompanying drawing illustrating a flow sheet of our process, a crude nickel sulphide A containing about 74% to about 76% nickel, about 1.5% to about 2.5% copper, and about 0.2% to about 0.5% iron, is desulphurized preferably by treating the sulphide in a pulverized or granulated condition in a "Down draft" sintering apparatus B.

The sulphur is reduced to the lowest amount commercially practicable which is about 0.2% to about 0.6%.

The desulphurized material is divided into two portions. One of the portions constitutes a major part which represents about 95% to about 97% of the desulphurized material. The other portion constitutes a minor part which represents about 3% to about 5% of said desulphurized material.

The minor part is ground to a fineness of say 40 to 60 mesh, in an appropriate grinding mill C. This ground material is heated in a reduction furnace D in contact with a reducing gas, such as water gas from a gas generator E, at a temperature so low that there is no incipient sintering of the metal so produced. In practice, this temperature is usually no higher than about 500° C. and preferably lies in a range from about 300° to about 500° C. The resulting metallic mass from the aforesaid reduction is in the form of a metallic powder F which is cooled in a reducing atmosphere or by submergence in water, for instance, so that practically no re-oxidation of the metal occurs. The metal powder contains about 95% to about 96.6% of nickel, about 1.9% to about 3.5% copper and about 0.3% to about 0.8% iron. The major part of the desulphurized material is heated in a smelting furnace G with coke, coal, charcoal or the like to a temperature of about 1500° C. to about 1550° C. to cause the reduction of the material to a molten metallic condition. The metal so produced is cast in molds to make anodes H of the usual form. These anodes have about the same composition as the above metallic powder.

The impure nickel anodes are placed in an electro tank J which holds a nickel electrolyte. This electrolyte contains 35 grams to 45 grams of nickel as sulphate, 15 grams to about 25 grams of boric acid and traces of copper and iron. In practice, it is preferred to use an electrolyte containing about 45 grams of nickel per liter, about 15 to 25 grams of boric acid per liter and a hydrogen ion concentration equivalent to a pH value of 4.8 to about 5.6%.

The anodes and the cathodes in the electro-tanks are separated by a porous diaphragm of well known construction so that the electrolyte is divided into two parts, an anolyte surrounding the anode and a catholyte surrounding the cathode. A flow of nickel electrolyte is maintained from the cathode to the anode at a velocity of about 0.0006 feet per minute to about 0.0008 feet per minute. By passing electric current through the cell, nickel is electro-deposited at the cathode while the copper ions and the ferrous ions are prevented by the flow of electrolyte from approaching the cathode but flow out of the cell with the anolyte.

After the cell has been in operation, the anolyte will contain about 45 grams of nickel, about 0.09 grams of copper and about 0.08 grams of iron per liter and will have a pH value of about 4.5 to about 5.6.

The anolyte K flows from electro-tank J and if necessary is heated in a reaction tank L. To the solution metal powder F is added in the proportion of about 1.2 parts of metal powder to about 1000 parts of solution. The metal powder and solution are agitated in the reaction tank at a temperature of about 55° C. or higher for a sufficient time to cause the cementation of the copper and reduce the hydrogen ion content of the solution to the desired extent. In practice about 2 hours are necessary to effect this treatment. The spent metal powder and the cemented copper are separated from the solution in any convenient manner. In practice, it is preferred to separate the spent metal powder and cemented copper from the solution by means of filter or settling tank. The filtrate is practically free from copper and has its hydrogen ion content reduced to a pH value of about 5.6 or higher.

The filtrate for the aforesaid treatment is transferred to an aerating tank N where iron is precipitated as iron hydroxide. A temperature of about 60° C. in aerating tank has been found suitable for causing the oxidation and hydrolysis of iron and the precipitation of iron hydroxide. In practice, it has been found that a temperature lying in a range from about 60° C. to about 90° C. will give satisfactory results. Air is passed through the solution to cause the oxidation and hydrolysis of iron with a consequent precipitation of iron hydroxide. The aforesaid reaction may be represented as follows:

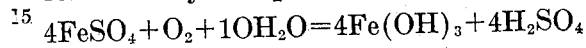

$$4FeSO_4 + O_2 + 10H_2O = 4Fe(OH)_3 + 4H_2SO_4$$

It will be noted that the aforesaid reaction liberates sulphuric acid which increased the hydrogen ion concentration in the solution. About 1.75 parts by weight of sulphuric acid are liberated for each part of iron oxidized and hydrolized.

The precipitate of iron hydroxide is removed in any suitable way such as by a filter P. The filtrate represents treated and purified electrolyte. This electrolyte is substantially free from copper and from iron and has approximately the hydrogen ion concentration required in the nickel electro-tank. If the hydrogen ion concentration is not at the exact value desired, some sulphuric acid may be added to restore the hydrogen ion to its proper value. In practice, the filtrate has a pH value of about 5.6.

The treated and purified electrolyte may now be returned to the catholyte in electro-tank J where further amounts of nickel can be electro-deposited at the cathode. When sufficient nickel has been deposited, the nickel cathodes S are removed from the electro-tank J and are ready for use or for melting into suitable shapes and forms.

What is claimed is:

1. The improvement in the art of treating a nickel-bearing solution contaminated with copper and iron which comprises adding to such a nickel-bearing solution low temperature, gas reduced metal powder consisting principally of nickel in an amount sufficient to effect cementation of dissolved copper and to effect a reduction of the hydrogen ion concentration to such an extent that iron dissolved in said solution will be precipitated directly as hydroxide solely by aeration of the solution and that the pH valve of the solution is greater than 5.6 whereby a purified nickel solution is produced and the precipitation of iron as hydroxide sets acid free in solution to restore the hydrogen ion concentration therein to approximately its normal value appropriate for the electrodeposition of nickel.

2. The improvement in the art of treating a nickel-bearing solution contaminated with copper and iron which comprises adding to such a nickel-bearing solution low temperature, gas reduced metal powder consisting principally of nickel in an amount sufficient to effect cementation of dissolved copper and to effect a reduction of the hydrogen ion concentration to such an extent that the pH value of the solution is greater than about 5.6 at which dissolved iron will be directly precipitated solely by aeration of the solution, permitting said metal powder to contact with said solution for a period of about two hours at a temperature of about 55° C. or higher separating copper cemented out of the solution by the aforesaid operations, aerating the solution at a temperature lying within a range from about 60° C. to about 90° C. to cause the direct precipitation of iron hydroxide, the precipitation of said iron as hydroxide sets acid free in solution to restore the hydrogen ion concentration therein to approximately its normal value appropriate for the electrodeposition of nickel removing said precipitate if iron hydroxide from the solution and using the solution thus freed from copper and iron in the electro-deposition of nickel.

3. The process of refining nickel-bearing materials which comprises subjecting crude nickel-bearing material to a roasting treatment to desulphurize the material, dividing the said desulphurized material into a major portion and a minor portion, forming from the major portion a solution containing nickel contaminated with copper and iron while the minor portion is subjected to a series of operations to convert the same into a low temperature, gas reduced metal powder, containing nickel, electro-depositing nickel from the aforesaid solution, removing a portion of the solution from which nickel has been electro-deposited and treating the thus-removed solution with such an amount of the said low temperature, gas reduced metal powder containing nickel as to effect cementation of dissolved copper and a reduction of the hydrogen ion concentration to such an extent that the pH value of the solution is greater than about 5.6 at which dissolved iron will be directly precipitated solely by aeration of the solution, removing cemented copper, aerating the solution at a temperature in excess of about 60° C. to cause precipitation of iron hydroxide the precipitation of said iron as hydroxide sets acid free in solution to restore the hydrogen ion concentration therein to approximately its normal value appropriate for the electrodeposition of nickel and removing the precipitate of iron hyroxide to produce a nickel solution substantially free from copper and iron and ready for reuse in the electrodeposition of nickel.

4. The process of refining nickel-bearing materials which comprises heat treating crude nickel-bearing material containing sulphides to desulphurize the same, forming from the desulphurized material a nickel solution containing copper and iron, subjecting said solution to electrolysis to cause the electro-deposition of nickel, removing a portion of said solution from which nickel has been electro-deposited, treating said removed portion with a low temperature, gas reduced metal powder containing nickel in an amount sufficient to cause the cementation of copper and the reduction of the hydrogen ion concentration to such an extent that the pH value of the solution is greater than about 5.6 at which dissolved iron will be directly precipitated solely by aeration of the solution, separating the cemented copper from the solution, aerating the copper-freed solution at a temperature of about 60° C. or higher to cause the precipitation of iron hydroxide, the precipitation of iron as hydroxide sets acid free in solution to restore the hydrogen ion concentration therein to approximately its normal value appropriate for the electrodeposition of nickel and removing the thus-precipitated iron hydroxide to produce a nickel solution substantially free from copper and iron and available for reuse in the electro-deposition of nickel.

5. The process set forth in claim 3 in which the crude nickel-bearing material contains about 74% to about 76% of nickel, about 1.5% to about 2.5% copper and about 0.2% to about 0.5% iron while the major portion constitutes about 95% to about 97% of the desulphurized material and the minor portion constitutes about 3% to about 5% of the desulphurized material.

6. The process of refining nickel-bearing materials which comprises subjecting the crude nickel-bearing sulphide to the action of heat to cause desulphurized material, dividing said desulphurized material into a major portion constituting about 95% to about 97% of the material and a minor portion constituting about 3% to about 5% of the material, forming nickel anodes contaminated with copper and iron from the major portion of the desulphurized material while the minor portion is treated by means of a reducing gas at relatively low temperatures between about 300° C. and about 500° C. to produce a low temperature, gas reduced metal powder containing nickel, placing the nickel anodes in a diaphragmed electrolytic cell containing an electrolyte consisting of about 35 to 45 grams per liter of nickel sulphate, about 15 grams to about 25 grams per liter of boric acid, a hydrogen ion concentration equivalent to a pH value of about 4.8 to about 5.6, and contaminated with copper and iron, causing the electro-deposition of nickel in said electrolytic cell where a flow of electrolyte is maintained from the cathode to the anode of the cell at a velocity of about 0.0006 ft. per minute to about 0.0008 ft. per minute, removing electrolyte from the anode compartment of the cell and adding to said removed electrolyte contaminated with copper and iron the low temperature, gas reduced metal powder containing nickel produced from the aforesaid minor portion of desulphurized material, maintaining said metal powder in contact with said removed solution for about two hours at a temperature of about 55° C. or higher, to cause cementation of copper and a reduction of the hydrogen ion concentration to an extent such that the pH value is greater than about 5.6, separating the cemented copper, aerating the solution thus-freed from copper at a temperature of about 60° C. to about 90° C. to cause the precipitation of iron hydroxide and removing the precipitate of iron hydroxide in electrolyte free from detrimental quantities of copper and iron and in a condition available for use in the electro-deposition of nickel.

In testimony whereof, we have hereunto set our hands.

ROBERT LEE PEEK.
CARL ALEXANDER KNITTEL.